United States Patent
Patole et al.

(10) Patent No.: US 12,401,430 B2
(45) Date of Patent: *Aug. 26, 2025

(54) WIRELESS POWER SYSTEMS WITH INTERFERENCE MITIGATION

(71) Applicant: Apple Inc., Cupertino, CA (US)

(72) Inventors: Sujeet Milind Patole, Cupertino, CA (US); Cheung-Wei Lam, Mountain View, CA (US); Vaneet Pathak, Los Altos Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/661,320

(22) Filed: May 10, 2024

(65) Prior Publication Data

US 2024/0305387 A1    Sep. 12, 2024

Related U.S. Application Data

(63) Continuation of application No. 18/341,518, filed on Jun. 26, 2023, now Pat. No. 12,015,450, which is a continuation of application No. 17/858,228, filed on Jul. 6, 2022, now Pat. No. 11,799,565.

(60) Provisional application No. 63/233,528, filed on Aug. 16, 2021.

(51) Int. Cl.
*H04B 15/02* (2006.01)
*H02J 50/10* (2016.01)
*H02J 50/80* (2016.01)

(52) U.S. Cl.
CPC .............. *H04B 15/02* (2013.01); *H02J 50/10* (2016.02); *H02J 50/80* (2016.02)

(58) Field of Classification Search
CPC .................................. H02J 50/80; H02J 50/12
See application file for complete search history.

(56) References Cited

U.S. PATENT DOCUMENTS

| | | | | |
|---|---|---|---|---|
| 5,959,849 A | * | 9/1999 | Batarseh | H02M 1/4258 363/16 |
| 8,779,745 B2 | * | 7/2014 | Brown | H02M 3/33561 323/285 |
| 9,985,481 B2 | | 5/2018 | Elad et al. | |
| 11,056,922 B1 | | 7/2021 | Shostak et al. | |
| 2008/0068236 A1 | * | 3/2008 | Sheba | G04F 10/005 341/131 |
| 2014/0265975 A1 | * | 9/2014 | Holmes | B60L 15/20 318/452 |
| 2017/0271927 A1 | | 9/2017 | Sakata et al. | |
| 2019/0131827 A1 | | 5/2019 | Johnston et al. | |
| 2019/0235041 A1 | | 8/2019 | Lee | |

(Continued)

FOREIGN PATENT DOCUMENTS

| | | |
|---|---|---|
| JP | 2017055591 A | 3/2017 |
| KR | 20160071381 A | 6/2016 |
| KR | 20200101237 A | 8/2020 |

*Primary Examiner* — Daniel Kessie

(74) *Attorney, Agent, or Firm* — Treyz Law Group, P.C.; Joseph F. Guihan

(57) ABSTRACT

A wireless power system has a wireless power transmitting device and a wireless power receiving device. A clock signal may be provided to inverter circuitry in wireless power transmitting circuitry at a power transmission frequency. The clock signal may cause transistors in the inverter circuitry to turn on and off to create AC current signals through the wireless power transmitting coil. The clock signal may be processed to mitigate electromagnetic interference in the system.

20 Claims, 10 Drawing Sheets

(56) References Cited

U.S. PATENT DOCUMENTS

2020/0076297 A1    3/2020  Nag et al.
2020/0343777 A1   10/2020  Jia et al.
2021/0234412 A1    7/2021  Walley et al.

\* cited by examiner

WIRELESS POWER SYSTEMS WITH INTERFERENCE MITIGATION

This application is a continuation of U.S. non-provisional patent application Ser. No. 18/341,518, filed Jun. 26, 2023, which is a continuation of U.S. non-provisional patent application Ser. No. 17/858,228, filed Jul. 6, 2022, now U.S. Pat. No. 11,799,565, issued Oct. 24, 2023, which claims the benefit of U.S. provisional patent application No. 63/233,528, filed Aug. 16, 2021, which are hereby incorporated by reference herein in their entireties.

FIELD

This relates generally to power systems, and, more particularly, to wireless power systems for charging electronic devices.

BACKGROUND

In a wireless charging system, a wireless power transmitting device transmits wireless power to a wireless power receiving device. The wireless power transmitting device uses a wireless power transmitting coil to transmit wireless power signals to the wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

A wireless power system has a wireless power transmitting device and a wireless power receiving device. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power.

A clock signal may be provided to inverter circuitry in the wireless power transmitting circuitry at a power transmission frequency. The clock signal may cause transistors in the inverter circuitry to turn on and off to create AC current signals through the wireless power transmitting coil (also at the power transmission frequency). To mitigate electromagnetic interference (EMI) in the system, the clock signal used to control the inverter may be frequency dithered. This effectively dithers the power transmission frequency of the wireless power transfer between the wireless power transmitting device and the wireless power receiving device.

The wireless power transmitting device may include dithering circuitry and clock modulating circuitry that are used to implement a spread spectrum clocking technique (sometimes referred to as clock dithering). In spread spectrum clocking, the edge of the clock waveform is intentionally modified such that the signal's spectrum is spread around the target frequency for the clock signal. This reduces the EMI associated with the target frequency of the clock signal.

The dithering circuitry in the wireless power transmitting device may generate an optimal modulating waveform for the clock signal based on the real time operating conditions in the wireless power system. The dithering circuitry may take into account information such as wireless power receiving device state of charge information, a maximum frequency jitter constraint, an occupied bandwidth constraint, wireless power receiving device parameters, wireless power transmitting device parameters, and/or a clock waveform.

DETAILED DESCRIPTION

A wireless power system includes a wireless power transmitting device. The wireless power transmitting device wirelessly transmits power to a wireless power receiving device. The wireless power transmitting device may be a charging puck, a charging mat, a portable electronic device with power transmitting capabilities, a removable battery case with power transmitting capabilities, or other power transmitter. The wireless power receiving device may be a device such as a cellular telephone, tablet computer, laptop computer, removable battery case, electronic device accessory, wearable such as a wrist watch, or other electronic equipment. The wireless power receiving device uses power from the wireless power transmitting device for powering the receiving device and for charging an internal battery.

Wireless power is transmitted from the wireless power transmitting device to the wireless power receiving device by using an inverter in the wireless power transmitting device to drive current through one or more wireless power transmitting coils. The wireless power receiving device has one or more wireless power receiving coils coupled to rectifier circuitry that converts received wireless power signals into direct-current power.

Figure 1:
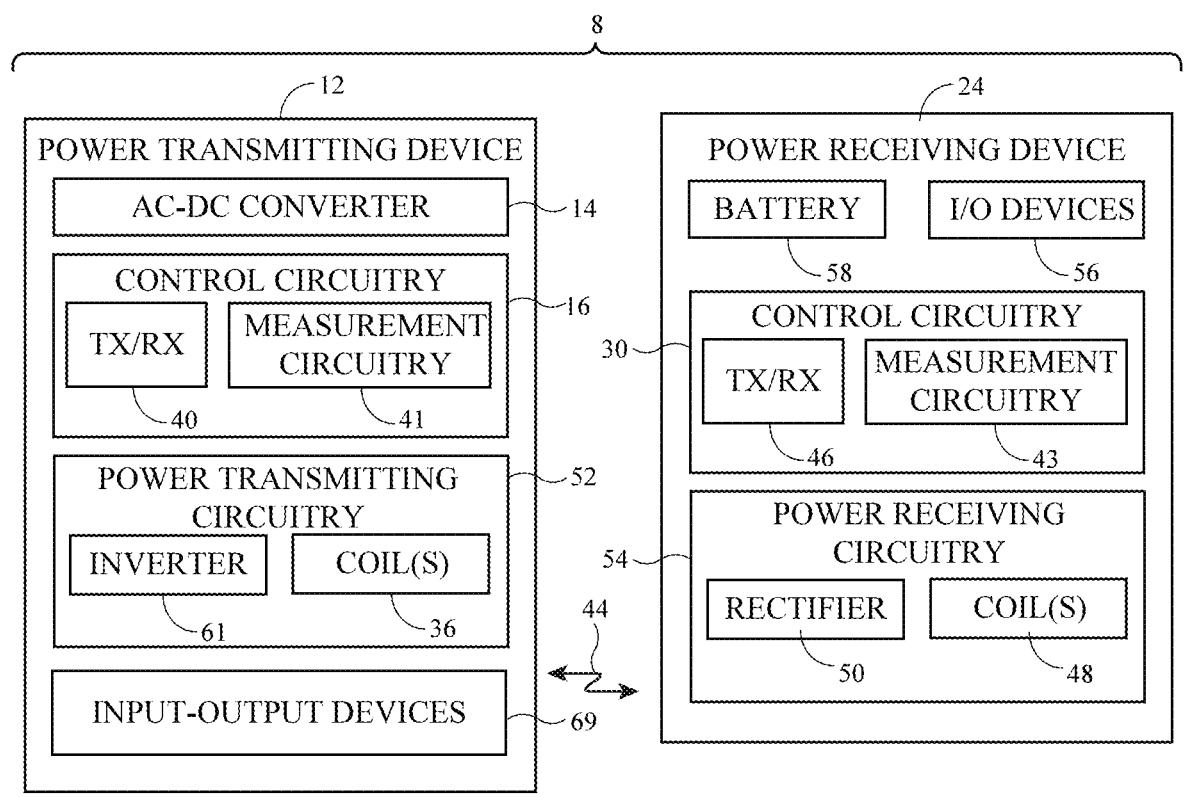
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in processing user input, handling negotiations between devices 12 and 24, sending and receiving in-band and out-of-band data, making measurements, estimating power losses, determining power transmission levels, and otherwise controlling the operation of system 8.

Control circuitry in system 8 may be configured to perform operations in system 8 using hardware (e.g., dedicated hardware or circuitry), firmware and/or software. Software code for performing operations in system 8 and other data is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment.

Power receiving device 24 may be a portable electronic device such as a cellular telephone, a laptop computer, a tablet computer, a wearable such as an earbud or wrist watch, a wirelessly charged removable battery case for an electronic device, or other electronic equipment. Power transmitting device 12 may be coupled to a wall outlet (e.g., an alternating-current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Multiple coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, portable electronic device such as a cellular telephone, etc.) may have only a single coil. In other arrangements, a wireless charging device may have multiple coils (e.g., two or more coils, 2-4 coils, 5-10 coils, at least 10 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-400 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display, speaker, camera, touch sensor, ambient light sensor, and other devices for gathering user input, making sensor measurements, and/or providing user with output. Device 12 may include input-output devices 69 (e.g., any of the input-output devices described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitudeshift keying (ASK) is used to convey in-band data from device 24 to device 12. Power may be conveyed wirelessly from device 12 to device 24 during these FSK and ASK transmissions.

Control circuitry 16 has measurement circuitry 41. Measurement circuitry 41 may include voltage measurement circuitry (e.g., for measuring one or more voltages in device 12 such as a coil voltage associated with a wireless power transmitting coil) and/or current measurement circuitry (e.g., for measuring one or more currents such as a wireless power transmitting coil current).

Control circuitry 30 has measurement circuitry 43. Measurement circuitry 43 may include voltage measurement circuitry (e.g., for measuring one or more voltages in device 24 such as a coil voltage associated with a wireless power transmitting coil and/or a rectifier output voltage) and/or current measurement circuitry (e.g., for measuring one or more currents such as wireless power receiving coil current and/or rectifier output current).

Figure 2:
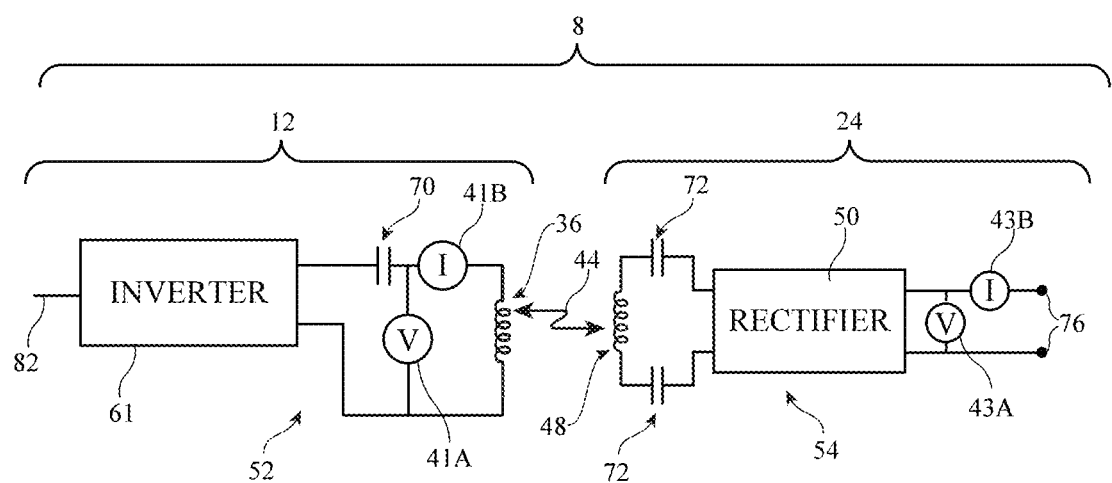
FIG. 2 is a circuit diagram of an illustrative wireless power system in accordance with an embodiment.

FIG. 2 shows illustrative wireless power circuitry in system 8 in an illustrative scenario in which a wireless power transmitting device has been paired with a wireless power receiving device. The wireless power circuitry of FIG. 2 includes wireless power transmitting circuitry 52 in wireless power transmitting device 12 and wireless power receiving circuitry 54 in wireless power receiving device 24. During operation, wireless power signals 44 are transmitted by wireless power transmitting circuitry 52 and are received by wireless power receiving circuitry 54. The configuration of FIG. 2 includes a single transmitting coil 36 and a single receiving coil 48 (as an example).

As shown in FIG. 2, wireless power transmitting circuitry 52 includes inverter circuitry 61. Inverter circuitry (inverter) 61 may be used to provide signals to coil 36. During wireless power transmission, the control circuitry of device 12 supplies signals to control input 82 of inverter 61 that cause inverter 61 to supply alternating-current drive signals to coil 36. Circuit components such as capacitor 70 may be coupled in series with coil 36 as shown in FIG. 2. Measurement circuitry 41 in device 12 may make measurements on operating currents and voltages in device 12. For example, voltage sensor 41A may be used to measure the coil voltage across coil 36 and current sensor 41B may be used to measure the coil current through coil 36. In other implementations, voltage across capacitor 70 is measured and current through the coil is inferred from that measurement.

When alternating-current current signals are supplied to coil 36, corresponding alternating-current electromagnetic signals (wireless power signals 44) are transmitted to nearby coils such as illustrative coil 48 in wireless power receiving circuitry 54. This induces a corresponding alternating-current (AC) current signal in coil 48. Capacitors such as capacitors 72 may be coupled in series with coil 48. Rectifier 50 receives the AC current from coil 48 and produces corresponding direct-current power (e.g., direct-current voltage Vrect) at output terminals 76. This power may be used to power a load. Measurement circuitry 43 in device 24 may make measurements on operating currents and voltages in device 24. For example, voltage sensor 43A may measure Vrect (the output voltage of rectifier 50) or a voltage sensor may measure the coil voltage on coil 48. Current sensor 43B may measure the rectifier output current of rectifier 50 or a current sensor may measure the current of coil 48.

If desired, some of the devices in wireless power system 8 may have both the ability to transmit wireless power signals and to receive wireless power signals. A cellular telephone or other portable electronic device may, as an example, have a single coil that can be used to receive wireless power signals from a charging puck or other wireless power transmitting device and that can also be used to transmit wireless power to another wireless power device (e.g., another cellular telephone, an accessory device, etc.). A device that can both transmit and receive wireless power may have all of the components of wireless power transmitting device 12 and all the components of wireless power receiving device 24 (e.g., power transmitting circuitry 52 and power receiving circuitry 54 are included in a single device). However, the functionality of the wireless power transmission and the wireless power reception is the same as described in connection with FIGS. 1 and 2. Therefore, although the examples herein will focus on a scenario where a dedicated wireless power transmitting device transfers charge to a dedicated wireless power receiving device, it should be understood that a device that both transmits and receives wireless power may be substituted for one or both devices.

Figure 3:
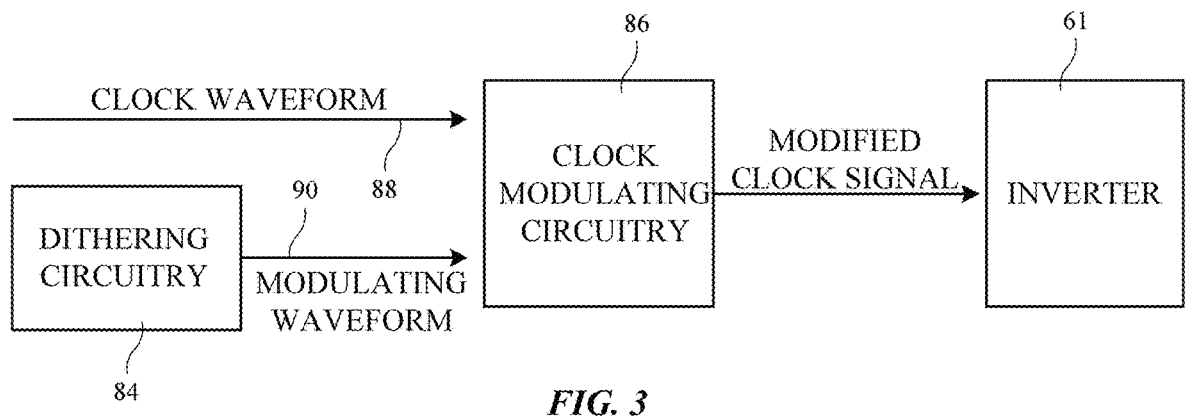
FIG. 3 is a schematic diagram of an illustrative power transmitting device that includes dithering circuitry in accordance with an embodiment.

FIG. 3 is a diagram of an illustrative power transmitting device with dithering circuitry. As previously mentioned, power transmitting device 12 transmits AC signals to power receiving device 24 at a power transmission frequency. The power transmission frequency may be between 100-400 kHz or any other desired magnitude. A clock signal may be provided to inverter circuitry 61 at the power transmission frequency to cause transistors in the inverter circuitry to turn on and off to create AC current signals through the wireless power transmitting coil (also at the power transmission frequency).

Care may be taken to mitigate electromagnetic interference (EMI) in system 8. One way to mitigate EMI in system 8 is to dither the clock signal used to control inverter 61 in wireless power transmission circuitry 52. This effectively dithers the power transmission frequency of the wireless power transfer between power transmitting device 12 and power receiving device 24. As shown in FIG. 3, power transmitting device 12 may include dithering circuitry 84 and clock modulating circuitry 86 that is used to perform frequency dithering during wireless power transfer operations. Dithering circuitry 84 and clock modulating circuitry 86 may be considered part of power transmission circuitry 52 and/or control circuitry 16 in device 12.

Dithering circuitry 84 may determine a modulating waveform 90 that is used to modulate the power transmission clock waveform 88. The clock waveform 88 may have the same frequency as the power transmission frequency. To mitigate EMI in system 8, a modulating waveform 90 is applied to clock waveform 88 by clock modulating circuitry 86. Clock modulating circuitry 86 may use modulating waveform 90 to frequency modulate clock waveform 88. The modified clock signal 92 is then provided to inverter 61 to create AC current signals for wireless power transmission.

In one possible arrangement, dithering circuitry 84 and clock modulating circuitry 86 may be used to implement a spread spectrum clocking technique (sometimes referred to as clock dithering). In spread spectrum clocking, the edge of the clock waveform is intentionally modified such that the signal's spectrum is spread around the target frequency for the clock signal. This reduces the EMI associated with the target frequency of the clock signal.

Figure 4:
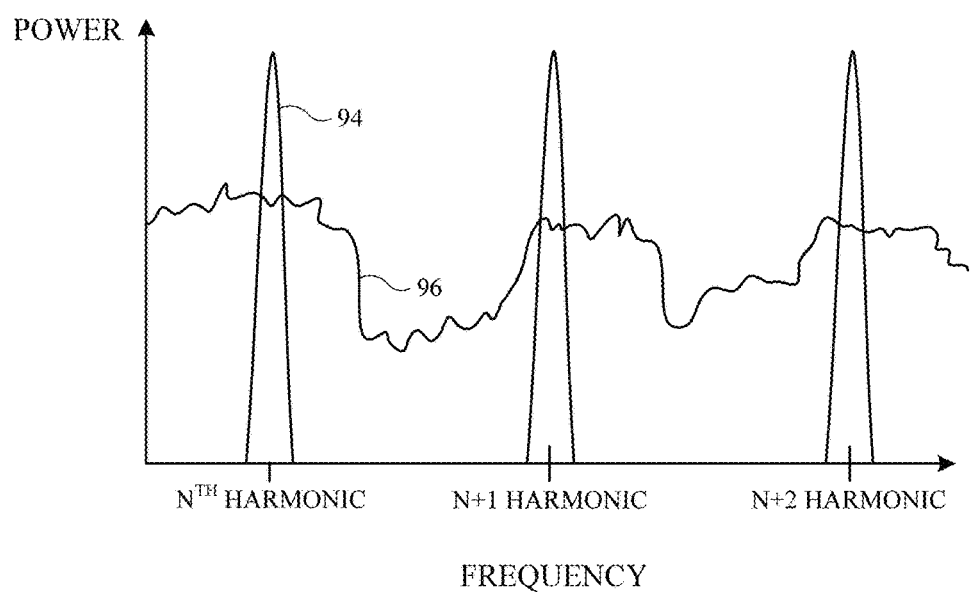
FIG. 4 is a graph of power as a function of frequency for a power transmitting device in accordance with an embodiment.

FIG. 4 is a graph of power as a function of frequency showing the effect of spread spectrum clocking. The graph of FIG. 4 may be obtained using a spectrum analyzer. Profile 94 shows the power as a function of frequency for a clock signal that does not undergo spread spectrum clocking (e.g., a regular square wave or sinusoidal wave at a constant frequency). As shown, without spread spectrum clocking, power peaks are present at each harmonic of the power transmission frequency. FIG. 4 shows the $N^{th}$ harmonic (e.g., the $N^{th}$ multiple of the power transmission frequency), N+1 harmonic, and N+2 harmonic. At each harmonic, a narrow peak is present. The height of the peaks may slowly decrease with an increasing harmonic number.

Profile 96 shows the power as a function of frequency for a clock signal that does undergo spread spectrum clocking. As shown, with spread spectrum clocking, the power is lower at the harmonic frequencies compared to the example without spread spectrum clocking (e.g., profile 96 is lower than profile 94 at the $N^{th}$ harmonic, N+1 harmonic, and N+2 harmonic). Between the harmonic frequencies, profile 96 is higher than profile 94. Spread spectrum clocking essentially distributes the power (and corresponding EMI) more evenly across the frequency spectrum (e.g., lowering power at the harmonic frequencies and increasing power at the non-harmonic frequencies). Additional EMI is therefore present at the non-harmonic frequencies relative to an unmodulated clock signal (e.g., profile 96 is higher than profile 94 between the harmonic frequencies). However, the spread spectrum clocking may ultimately be beneficial due to the reduced EMI at the harmonic frequencies.

Figure 5:
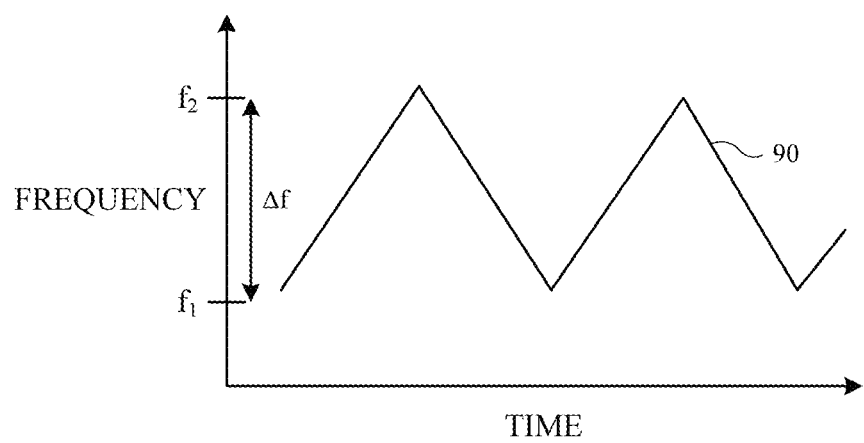
FIG. 5 is a graph of an illustrative modulating waveform that may be used to modulate a clock signal in a power transmitting device in accordance with an embodiment.

FIG. 5 is a graph of an illustrative modulating waveform that may be used for spread spectrum clocking. The modulating waveform is used to frequency modulate the carrier wave (e.g., the original clock waveform 88). The modulating waveform may have a corresponding frequency $f_m$ and a frequency spread $\Delta f$. Frequency $f_m$ is the frequency of modulating wave 90. In other words, the modulating waveform sweeps between two fixed frequencies $f_1$ and $f_2$ at the frequency $f_m$. The difference between frequencies $f_1$ and $f_2$ may sometimes be referred to as the frequency spread or frequency deviation ($\Delta f$) of the modulating waveform.

For example consider the example where the wireless power system selects a power transmission frequency of 140 kHz. The unmodified clock waveform 88 may be a square wave or sinusoidal wave at 140 kHz. The modulating waveform 90 may have a frequency spread ($\Delta f$) of 10 kHz and a frequency ($f_m$) of 15 kHz. In this example, after waveform 88 is frequency modulated with modulating waveform 90, the modified clock signal may, at a 15 kHz frequency, sweep back and forth between 135 kHz and 145 kHz. In this example, the frequency spread of the modulating waveform is distributed evenly about the original frequency 140 kHz. This may be referred to as a center spread. Alternatively, the frequency modulation may be down spread (such that the modified clock signal sweeps back and forth between 130 kHz and 140 kHz) or up spread (such that the modified clock signal sweeps back and forth between 140 kHz and 150 kHz).

There are many options for the modulating waveform frequency $f_m$, frequency deviation $\Delta f$, and waveform shape. Frequency $f_m$ may be greater than 0 kHz, greater than 5 kHz, greater than 10 kHz, greater than 20 kHz, greater than 30 kHz, greater than 40 kHz, greater than 50 kHz, greater than 75 kHz, greater than 100 kHz, greater than 200 kHz, less than 5 kHz, less than 10 kHz, less than 20 kHz, less than 30 kHz, less than 40 kHz, less than 50 kHz, less than 75 kHz, less than 100 kHz, less than 200 kHz, etc. Frequency deviation $\Delta f$ may be greater than 0 kHz, greater than 1 kHz, greater than 3 kHz, greater than 5 kHz greater than 10 kHz, greater than 20 kHz, greater than 30 kHz, greater than 40 kHz, greater than 50 kHz, less than 1 kHz, less than 3 kHz, less than 5 kHz less than 10 kHz, less than 20 kHz, less than 30 kHz, less than 40 kHz, less than 50 kHz, etc. In FIG. 5, modulating waveform 90 has a triangular shape. This example is merely illustrative. In general, modulating waveform 90 may have any desired shape (e.g., sinusoidal shape, square shape, sawtooth shape, a randomized shape, or a step shape that approximates any of the aforementioned shapes).

Figure 6A:
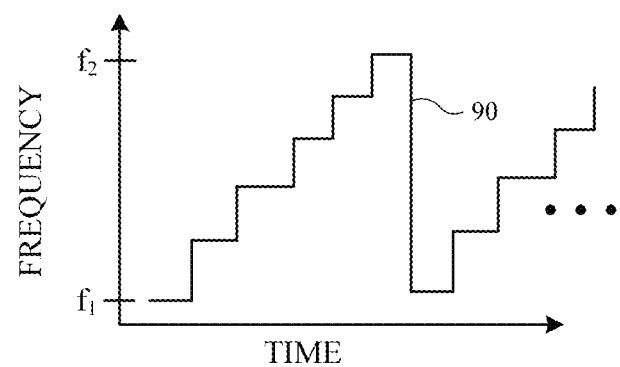
FIG. 6A is a graph of an illustrative modulating waveform that has a regular step shape in accordance with an embodiment.
Figure 6B:
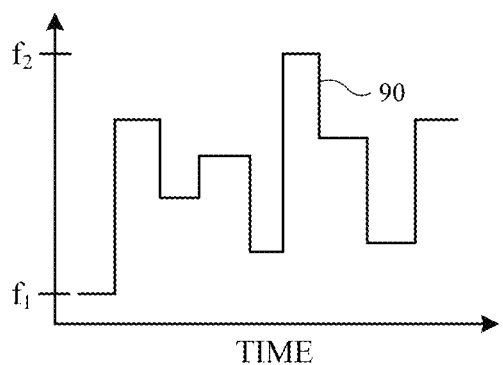
FIG. 6B is a graph of an illustrative modulating waveform that has an irregular step shape in accordance with an embodiment.

FIGS. 6A and 6B are graphs of illustrative modulating waveforms 90 that may be used in clock signal dithering for wireless power transmission. FIG. 6A is an example of a waveform that has a step shape that follows a regular pattern (i.e., a regular step shape). In FIG. 6A, the regular step shape approximates a sawtooth shape. The waveform increases in successive steps between a minimum frequency $f_1$ and a maximum frequency $f_2$. Once $f_2$ is reached, the waveform returns to $f_1$ and repeats the pattern. In FIG. 6A, there are six frequencies used in the waveform (e.g., $f_1$, $f_2$, and four intervening frequencies). The duration the clock signal spends at each frequency (e.g., the width of each step) may be the same or approximately the same. Alternatively, the duration the clock signal spends at each frequency may be varied if desired.

In FIG. 6B, the modulating waveform 90 has an irregular step shape. Similar to as in FIG. 6A, the waveform of FIG. 6B may have successive steps between a minimum frequency $f_1$ and a maximum frequency $f_2$. In FIG. 6B, there are six frequencies used in the waveform (e.g., $f_1$, $f_2$, and four intervening frequencies). However, in FIG. 6B, the frequencies are not stepped through in ascending (or descending) order. The steps proceed in a random order such that the waveform is not necessarily continuously increasing (as in FIG. 6A) or decreasing (e.g., an opposite arrangement to FIG. 6A). Using an irregular waveform of this type may be used to optimize the spread spectrum clocking in power transmission device 12. The random order may be repeated in each cycle or may be randomized after each cycle.

A waveform with a stepped shape (in either a regular pattern as in FIG. 6A or an irregular pattern as in FIG. 6B) may include any desired number of steps (e.g., three, four, five, six, seven, eight, more than eight, more than ten, etc.).

To summarize, the modulating waveform may have a number of discrete steps. The sequence in which these frequency steps are taken and the duration of each frequency step may be optimized for EMI attenuation. The frequency steps may be sequenced in a periodic or random fashion. Optimal sequences may be found using exhaustive search techniques or optimization techniques that use genetic algorithms and/or neural networks.

Figure 7:
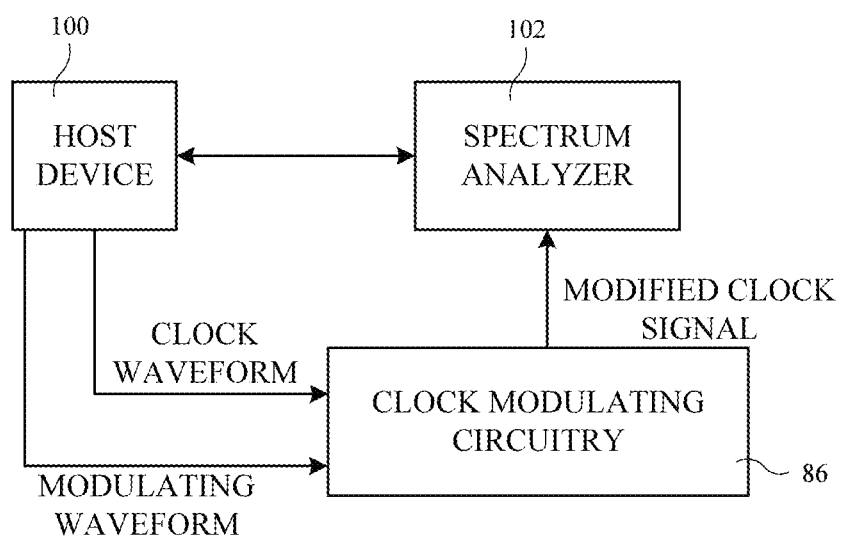
FIG. 7 is a schematic diagram of an illustrative system for testing the performance of different modulating waveforms in accordance with an embodiment.

FIG. 7 is a diagram of an illustrative system that may be used to test the efficacy of various dithered clock signals. As shown, the system includes a host device 100. Host 100 may include computing equipment such as a personal computer, laptop computer, tablet computer, or handheld computing device. Host 100 may include one or more networked computers. Host 100 may maintain a database of results, may be used in sending commands to clock modulating circuitry 86, may be used in sending commands to spectrum analyzer 102, may receive data from spectrum analyzer 102, etc.

During operation of the system of FIG. 7, host device 100 may send a plurality of different clock waveforms and modulating waveforms to clock modulating circuitry 86. The clock modulating circuitry frequency modulates the clock waveform using the modulating waveform and outputs the corresponding modified clock signal to spectrum analyzer 102. Spectrum analyzer 102 measures the magnitude of the modified clock signal across a range of frequencies to measure the power at different frequencies. Spectrum analyzer 102 may output data corresponding to a given modified clock signal to host device 100. Host device 100 may maintain a database of test results associated with different clock waveforms and modulating waveforms.

FIG. 7 shows an example where spectrum analyzer 102 tests the modified clock signal provided directly from clock modulating circuitry 86. This example is merely illustrative. If desired, the spectrum analyzer 102 may instead test the alternating-current drive signals provided by inverter 61 to coil 36 based on the modified clock signal received by inverter 61. As yet another example, the spectrum analyzer 102 may instead test the alternating-current (AC) current signals that are induced in coil 48. Circuit simulation tools may be used in addition to or instead of spectrum analyzer 102 to determine the performance of the modulated clock signals.

The operating parameters of spectrum analyzer 102 (e.g., center frequency, span, scan time, resolution bandwidth (RBW), video bandwidth (VBW), attenuation/amplification, etc.) may be tuned to obtain desired spectrum data during testing operations.

Host device 100 may perform various tests to optimize the modulating waveform to have minimized EMI (maximum attenuation) at one or more frequencies of interest during wireless power transfer operations. For example, power transmitting device 12 and/or power receiving device 24 may have design constraints with EMI requirements at certain frequencies. Host device 100 may optimize the modulating waveform to meet all of these EMI requirements and reduce EMI as much as possible at the frequencies of interest.

Host device 100 may test numerous frequency spreads ($\Delta f$) for the modulating waveform. For example, in one series of tests, the shape of the modulating waveform, properties of the clock waveform, modulating waveform frequency $f_m$, and other operating conditions may remain constant while different frequency spread magnitudes are used. The host device may step through frequency spreads at regular intervals (e.g., x, 2x, 3x, 4x, etc.) through a desired range of frequencies, may test various irregularly spaced frequency spreads, etc.

Small changes in $\Delta f$ may have significant impacts on attenuation at certain frequencies of interest. As an example, attenuation at a given $N^{th}$ harmonic may have improvements when the equation $2*\Delta f*N/f_{clock}$ (where $\Delta f$ is the frequency spread, N is the harmonic number of interest, and $f_{clock}$ is the frequency of the clock signal) is equal or approximately equal to (e.g., within 5%, within 3%, within 1%, etc.) an even integer. Take an example where $f_{clock}$ is 360 KHz and attenuation is desired at the $85^{th}$ harmonic (30.6 MHZ). Attenuation may have local maxima when $\Delta f$ is equal to 8.5 kHz (where $2*\Delta f*N/f_{clock} \approx 4$), 12.7 kHz (where $2*\Delta f*N/f_{clock} \approx 6$), and 16.9 kHz (where $2*\Delta f*N/f_{clock} \approx 8$). The learnings from the frequency spread tests may be used to optimize frequency dithering of the clock signal in subsequent operations of a power transmitting device 12 (e.g., may be used to develop an algorithm used by dithering circuitry 84 in device 12 to produce an optimal modulating waveform for real time conditions).

Host device 100 may also test numerous frequencies ($f_m$) for the modulating waveform. For example, in one series of tests, the shape of the modulating waveform, properties of the clock waveform, modulating waveform frequency spread $\Delta f$, and other operating conditions may remain constant while different frequency magnitudes are used. The host device may step through frequencies at regular intervals (e.g., x, 2x, 3x, 4x, etc.) through a desired range of frequencies, may test various irregularly spaced frequencies, etc. In one example, larger frequencies (e.g., 45 kHz) may have more attenuation at a wavelength of interest (e.g., the $85^{th}$ harmonic of 360 kHz) than lower frequencies (e.g., 5 kHz, 10 kHz, 20 kHz). The learnings from the frequency tests may be used to optimize frequency dithering of the clock signal in subsequent operations of a power transmitting device 12 (e.g., may be used to develop an algorithm used by dithering circuitry 84 in device 12 to produce an optimal modulating waveform for real time conditions).

Host device 100 may also test numerous waveform shapes for the modulating waveform. For example, in one series of tests, the properties of the clock waveform, the frequency of the modulating waveform, the frequency spread of the modulating waveform, and other operating conditions may remain constant while different modulating waveform shapes are used (e.g., sawtooth, triangular, sine, square, etc.). The host device may test each shape to determine the magnitude of attenuation at one or more wavelengths of interest for each shape. In one example, a modulating waveform having a sawtooth shape may have more attenuation at a wavelength of interest (e.g., the $85^{th}$ harmonic of 360 kHz) than a modulating waveform having a triangular, sine, or square shape. The learnings from the waveform shape tests may be used to optimize frequency dithering of the clock signal in subsequent operations of a power transmitting device 12 (e.g., may be used to develop an algorithm used by dithering circuitry 84 in device 12 to produce an optimal modulating waveform for real time conditions).

As previously mentioned, a modulating waveform may have a plurality of frequency steps (e.g., that approximate a sawtooth shape or other desired shape or that have a random order). For a modulating waveform having a plurality of frequency steps, the sequence in which the frequency steps are taken and the duration of each frequency step may be optimized. In one example, host device 100 may perform an exhaustive search on frequency-step-order given a number of constraints. As an example, for a constant clock frequency, modulating waveform frequency, number of steps, and spread between each step, the order of the frequency steps may be tested. Consider a 6-step profile approximating a sawtooth shape (similar to as in FIG. 6A) that includes progressively increasing frequencies $f_1$, $f_2$, $f_3$, $f_4$, $f_5$, and $f_6$ (e.g., $f_1 < f_2 < f_3 < f_4 < f_5 < f_6$). Host device may provide a modulating waveform with these frequency steps in each possible permutation. For example, in a first test, the waveform may have frequency steps in the order $f_1$, $f_2$, $f_3$, $f_4$, $f_5$, then $f_6$. In a second test, the waveform may have frequency steps in the order $f_1$, $f_2$, $f_3$, $f_4$, $f_6$, then $f_5$. In a third test, the waveform may have frequency steps in the order $f_1$, $f_2$, $f_3$, $f_6$, $f_4$, then $f_5$. In a fourth test, the waveform may have frequency steps in the order $f_1$, $f_2$, $f_3$, $f_6$, $f_5$, then $f_4$. This process may be repeated until each permutation of $f_1$-$f_6$ is tested (e.g., an exhaustive search). The best candidates (e.g., the sequences that produce the most attenuation at one or more frequencies of interest) may be stored for future use in optimizing frequency dithering of the clock signal in subsequent operations of a power transmitting device 12 (e.g., may be used to develop an algorithm used by dithering circuitry 84 in device 12 to produce an optimal modulating waveform for real time conditions).

To summarize, any desired properties (e.g., frequency, frequency spread, waveform shape, frequency-step order, frequency-step duration, etc.) of the modulating waveform may be tested to determine the impact of those properties on attenuation at frequencies of interest and find optimal values for those properties. The properties may be tested in isolation (as described above). However, this example is merely illustrative and, in general, combinations of properties may also be tested to find optimal property sets.

Modulating waveforms may also be tested for efficacy under different operating conditions. During normal operating conditions (in the field), power transmission device 12 (with clock modulating circuitry 86) transmits power to power receiving device 24 while power receiving device 24 has different load conditions. The load current (e.g., the current supplied by rectifier 50) of the power receiving device may vary depending on the operating state of the power receiving device (e.g., which input-output components in the power receiving device are in use), the state of charge of the power receiving device, etc.

When operating under different load conditions, the waveform shape of the AC signals used for wireless power transfer may vary. For example, the duty cycle, rise time, fall time, undershoot, and/or overshoot of the AC signals (provided by inverter 61 and coil 36 and/or received by coil 48) may vary depending on the load conditions of the wireless power receiving device. These changes in shape may influence the frequency dithering operations to mitigate EMI.

For example, power receiving device 24 may receive wireless power while the state of charge is equal to 20%. Under these conditions, the AC signals may have a waveform shape that causes undesirably high EMI at a frequency $f_1$. A first dithering pattern (that optimizes EMI mitigation at $f_1$) may be optimal in these conditions. At a subsequent time, power receiving device 24 may receive wireless power while the state of charge is equal to 80%. Under these conditions, the AC signals may have a waveform shape that causes undesirably high EMI at a frequency $f_2$ that is different than $f_1$. A second dithering pattern (that optimizes EMI mitigation at $f_2$) may be optimal in these conditions.

Additionally, given the different waveforms that result from the different load conditions at different states of charge, mitigating EMI at a given frequency of interest may require different optimal dithering patterns at different states of charge. For example, power receiving device 24 may receive wireless power while the state of charge is equal to 20% and there is a corresponding first load current for the power receiving device. A first dithering pattern may be optimal to mitigate EMI at a frequency $f_1$ in these conditions. At a subsequent time, power receiving device 24 may receive wireless power while the state of charge is equal to 80% and there is a corresponding second load current for the power receiving device. A second dithering pattern that is different than the first dithering pattern may be optimal to mitigate EMI at the frequency $f_1$ in these conditions.

For example, while the state-of-charge is equal to 20%, the optimal frequency spread of the modulating waveform to mitigate EMI at $f_1$ may be 10 kHz but while the state-of-charge is equal to 80%, the optimal frequency spread of the modulating waveform to mitigate EMI at $f_1$ may be 20 kHz. As another example, while the state-of-charge is equal to 20%, the optimal modulating waveform to mitigate EMI at $f_1$ may have a sawtooth shape but while the state-of-charge is equal to 80%, the optimal modulating waveform to mitigate EMI at $f_1$ may have a triangular shape. These examples are merely illustrative and demonstrate how the modulating waveform may have different optimal properties in different operating conditions.

To account for these differences, the aforementioned tests (e.g., using the system of FIG. 7) may also be performed at different operating conditions. For example, tests may be performed while the power receiving device has different states of charge, different corresponding load conditions, etc.

Host device 100 may, in one possible embodiment, test the modulating waveform properties and only use direct test results for optimization of the modulating waveform. Alternatively, host device 100 may include a machine learning classifier that uses the test results to develop a machine learning algorithm that optimizes the modulating waveform properties. The machine learning algorithm may output an optimized modulating waveform for a given set of constraints. The developed machine learning algorithm may subsequently be used in dithering circuitry 84 in power transmitting device 12.

As described above, the state-of-charge of a wireless power receiving device may influence the optimal frequency dithering pattern for wireless power transmission. Therefore, it is desirable for wireless power transmitting device 12 to know the state of charge of wireless power receiving device 24 during wireless power transfer operations. When power transmitting device 12 knows the state of charge of wireless power receiving device 24, power transmitting device 12 can factor in the state of charge when optimizing the frequency dithering pattern.

In some cases, the wireless power transmitting device 12 may receive state of charge information directly from wireless power receiving device 24. The wireless power receiving device 24 may report its state of charge to wireless power transmitting device 12 at regular intervals, when the state of charge changes by a certain amount from the previously reported state of charge, etc. Alternatively, wireless power transmitting device 12 may intermittently query wireless power receiving device 24 for its state of charge. In response to receiving the query, wireless power receiving device 24 may report its state of charge to wireless power transmitting device 12. These types of communications may be performed either in-band (e.g., using coils 36 and 48 and simultaneously with power transfer) or out-of-band (e.g., using separate communication antennas such as Bluetooth antennas).

When wireless power receiving device 24 reports its state of charge to wireless power transmitting device 12, control circuitry within wireless power transmitting device 12 may decode data received from the wireless power receiving device. The decoded data may represent a state of charge magnitude reported by the wireless power receiving device. The data may be received by wireless power transmitting device 12 using the power transmitting coil 36 (e.g., using in-band communication) or using an antenna formed separately from the coil (e.g., using out-of-band communication).

Direct reporting of the state of charge is the most accurate way for the wireless power transmitting device 12 to determine the state of charge of the wireless power receiving device 24. However, some wireless charging communication protocols may not involve (or allow) reporting of state of charge from the power receiving device to the power transmitting device. In these instances, power transmitting device 12 may measure parameters associated with power transfer coil 36 and use these measured parameters to estimate the state of charge of receiver 24.

As previously mentioned, measurement circuitry 41 in device 12 may make measurements on operating currents and voltages in device 12. For example, voltage sensor 41A may be used to measure the coil voltage across coil 36 and current sensor 41B may be used to measure the coil current through coil 36 (see FIG. 2). The coil voltage and coil current may be two parameters that wireless power transmitting device 12 uses to estimate the wireless power receiving device's state of charge. Additional parameters such as duty cycle (e.g., the duty cycle or the clock signal and corresponding AC drive signals generated by inverter 61) may be used to estimate the wireless power receiving device's state of charge. To summarize, control circuitry within power transmitting device 12 may determine an operating parameter of the wireless power transmitting device 12 (e.g., coil voltage, coil current, etc.) in order to determine wireless power receiving device state of charge information.

While in certain embodiments it is beneficial for wireless transceivers to report information such as state of charge for feedback and power delivery control, the above-described technology need not involve the transmission of personally identifiable information to function. Out of an abundance of caution, it is noted that to the extent that any implementation of this charging technology involves the use of data communication between wireless power transmitters and receivers, the information communicated should be used for controlling power delivery, and implementers should follow privacy policies and practices that are generally recognized as meeting or exceeding industry or governmental requirements for maintaining the privacy of users.

Figure 8:
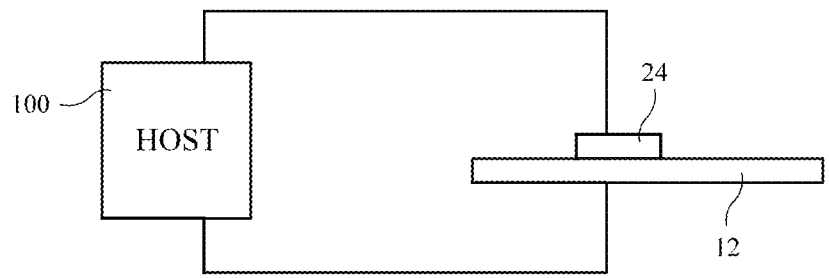
FIG. 8 is a schematic diagram of an illustrative system that is used to obtain data for correlating power transmitter device parameters to a power receiving device state of charge magnitude in accordance with an embodiment.

FIG. 8 is a diagram of a system that may be used to determine correlations between power transmitting device parameters (such as duty cycle, coil voltage, and/or coil current) and the state of charge of power receiving device 24. As shown in FIG. 8, a host device 100 may be connected to a wireless power transmitting device 12 and a wireless power receiving device 24. Host 100 may include computing equipment such as a personal computer, laptop computer, tablet computer, or handheld computing device. Host 100 may include one or more networked computers. Host 100 may maintain a database of results, may be used in sending commands to wireless power transmitting device 12 and/or wireless power receiving device 24, may receive data from wireless power transmitting device 12 and/or wireless power receiving device 24, etc.

Host 100 may obtain data on the wireless power transmitting device 12 while wireless power receiving device 24 is at various known states of charge. For example, wireless power transmitting device parameters (e.g., duty cycle, coil current, and coil voltage) may be measured during power transfer while wireless power receiving device 24 has a first state of charge (e.g., 25%), wireless power transmitting device parameters (e.g., duty cycle, coil current, and coil voltage) may be measured during power transfer while wireless power receiving device 24 has a second state of charge that is different than the first state of charge (e.g., 50%), wireless power transmitting device parameters (e.g., duty cycle, coil current, and coil voltage) may be measured during power transfer while wireless power receiving device 24 has a third state of charge that is different than the second state of charge (e.g., 75%), etc. A machine learning classifier may use the test results to develop a machine learning algorithm that estimates receiver state of charge based on transmitter operating parameters. The developed machine learning algorithm may subsequently be used in dithering circuitry 84 in power transmitting device 12.

Therefore, instead of or in addition to using direct-reported state of charge information, wireless power transmitting device 12 may use proxy information (e.g., transmitter duty cycle, transmitter coil current, transmitter coil voltage) to estimate the receiver's state of charge. For simplicity, both direct-reported receiver state of charge information and proxy information for receiver state of charge may be referred to herein as state of charge information (or receiver state of charge information). Said another way, power transmitting device 12 may determine the receiver state of charge information using decoded data received directly from the power receiving device 24 (e.g., direct-reported data) or using operating parameters of the power transmitting device (e.g., proxy information).

The testing operations described in connection with FIGS. 7 and 8 may be used to develop an optimization algorithm that is used by dithering circuitry 84 to determine an optimal modulating waveform for a given set of conditions and constraints.

Figure 9:
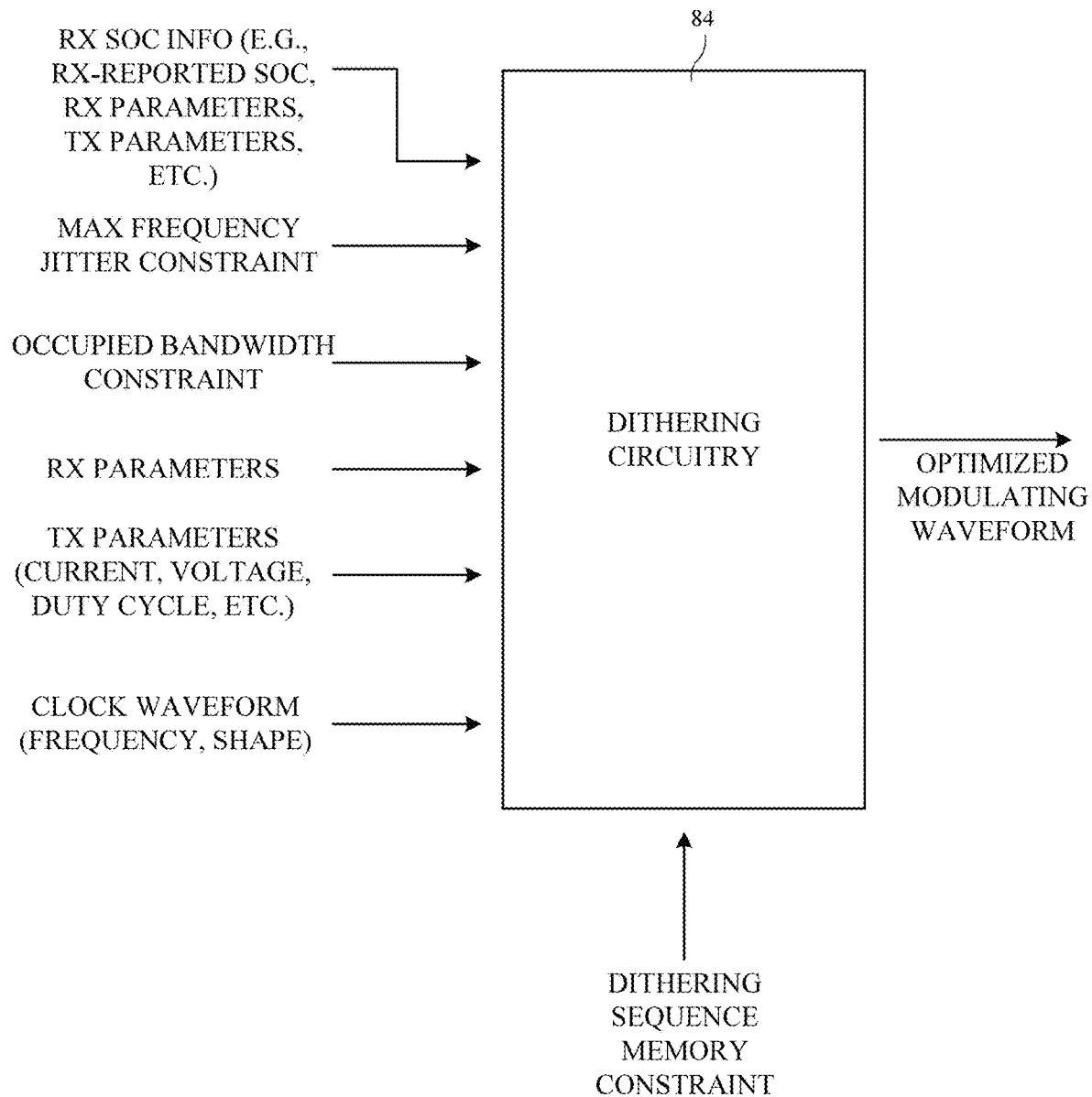
FIG. 9 is a schematic diagram of illustrative dithering circuitry in a power transmitting device that is used to output an optimized modulating waveform for frequency dithering in accordance with an embodiment.

FIG. 9 is a diagram of dithering circuitry 84 showing the various inputs used by the dithering circuity to determine an optimized modulating waveform. As shown in FIG. 9, dithering circuitry 84 may receive receiver state of charge information. As previously discussed, the receiver state of charge information may include either direct-reported receiver state of charge information (e.g., a state of charge reported by the power receiving device to the power transmitting device using in-band or out-of-band communication) or proxy information for receiver state of charge (e.g., the duty cycle, current, or voltage for the transmitting coil 36 in device 12). The proxy information may include measured/known transmitting device parameters as well as known (e.g., through in-band or out-of-band communication) receiving device parameters. When dithering circuitry 84 receives proxy information for the receiver state of charge, dithering circuitry 84 may estimate the receiver state of charge using the proxy information and use the estimated state of charge for subsequent determinations.

In addition to receiver state of charge information, dithering circuitry 84 may receive constraints such as a maximum frequency jitter constraint. The maximum frequency jitter constraint may be fixed or may be updated over time (e.g., by control circuitry 16).

An occupied bandwidth constraint may also be taken into account by dithering circuitry 84. Occupied bandwidth refers to the range of frequencies that contain the majority of the modulated communication signal power. Various communication standards have limits on the occupied bandwidth's range. These occupied bandwidth constraints may limit, for example, the magnitude of frequency spread $\Delta f$ for the modulating waveform output by dithering circuitry 84.

Dithering circuitry 84 may also receive information on the wireless power receiving device 24 (RX parameters) and wireless power transmitting device 12 (TX parameters). The receiver parameters received by dithering circuitry 84 may include the output voltage of rectifier 50 (as measured by voltage sensor 43A), a voltage of coil 48 in the power receiving device, a rectifier output current of rectifier 50 (as measured by current sensor 43B in FIG. 2), or a current of coil 48 in the power receiving device. This information may be received at wireless power transmitting device 12 from wireless power receiving device 24 using in-band communication or out-of-band communication. In some cases, device 12 may also or instead have a priori knowledge of certain operating parameters of device 24 (e.g., device type, coil characteristics, etc.) that are used by dithering circuitry 84 to determine an optimized modulating waveform.

The wireless power transmitting device parameters may include the voltage of coil 36 (as measured by voltage sensor 41A), the current of coil 36 (as measured by current sensor 41B), the duty cycle of inverter 61, etc.

Dithering circuitry 84 may also receive information regarding the clock waveform (e.g., the target for the dithering operations). In some wireless charging systems, the power transmission frequency may be negotiated between devices 12 and 24 (e.g., the power transmission frequency is not fixed). As an example, power transmitting device 12 may transmit wireless power signals at a frequency of 120 kHz when a first wireless power receiving device is adjacent to the power transmitting device. Subsequently, transmitting device 12 may transmit wireless power signals at a frequency of 180 kHz when a second wireless power receiving device is adjacent to the power transmitting device (or when the first wireless power receiving device is removed and again placed adjacent to the power transmitting device). Accordingly, the frequency (and shape) of the clock signal for a given power transmission session may be provided to dithering circuitry 84.

Dithering circuitry 84 may also have a dithering sequence memory constraint, as shown in FIG. 9. The memory constraint may, as an example, result in limits on the number of frequency steps permitted in a stepped waveform shape.

Based on all of these inputs, the dithering circuitry 84 outputs an optimized modulating waveform. The optimized modulating waveform is subsequently used by clock modulating circuitry 86 to dither the clock waveform. The modified (dithered) clock signal is then provided to inverter 61 to apply AC drive signals to coil 36 and transmit wireless power to coil 48 in wireless power receiving device 24. In other words, the power transmission frequency is dithered based on the optimized modulating waveform.

It should be understood that dithering circuitry 84 may provide the properties of the modulating waveform to clock modulating circuitry if desired. For example, dithering circuitry 84 provides clock modulating circuitry with a frequency, frequency spread, and waveform shape for the modulating waveform. Clock modulating circuitry 86 then uses the received properties characterizing the modulating waveform to modulate the clock waveform.

Figure 10:
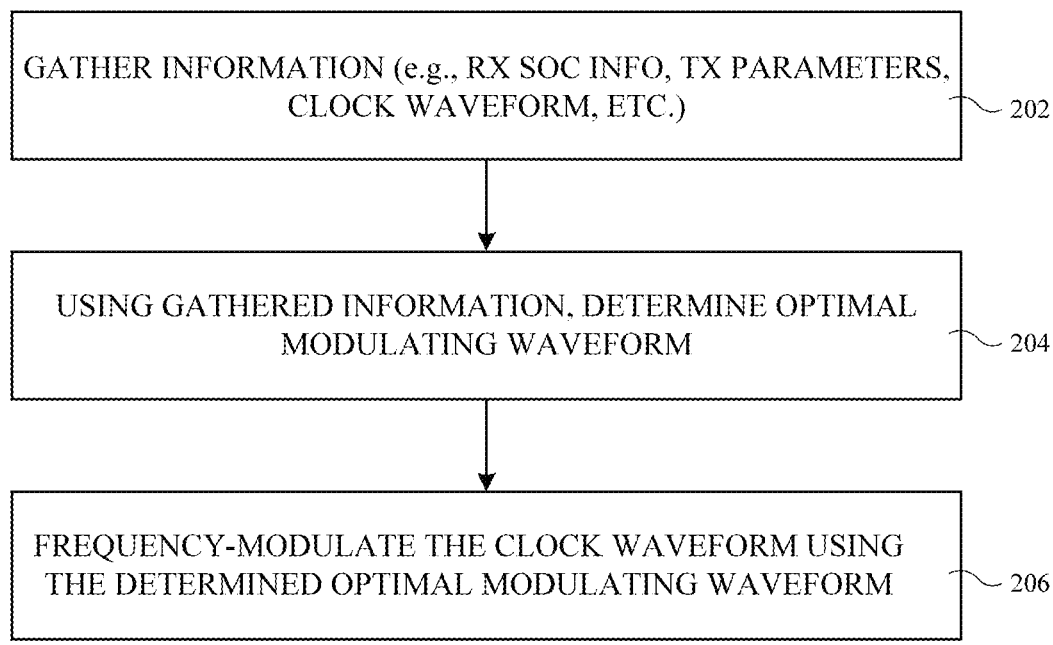
FIG. 10 is a flowchart of illustrative operations for operating a power transmitting device that performs frequency dithering of a clock signal in accordance with an embodiment.

FIG. 10 is a flow chart of illustrative operations involved in using a wireless power system in accordance with an embodiment. As shown, at step 202, dithering circuitry such as dithering circuitry 84 (which may be considered part of control circuitry 16 and/or power transmission circuitry 52) may gather information. The gathered information may include any of the inputs shown in FIG. 9 including wireless power receiving device state of charge information, a maximum frequency jitter constraint, an occupied bandwidth constraint, wireless power receiving device parameters, wireless power transmitting device parameters, and a clock waveform. The received information may be received from sensors within power transmitting device 12 (e.g., voltage sensor 41A or current sensor 41B in FIG. 2), may be received from device 24 (e.g., using in-band communication or using out-of-band communication), may be received from control circuitry 16, may be derived based on known information within the transmitting device, etc.

At step 204, control circuitry within power transmitting device 12 (e.g., dithering circuitry 84) may use the gathered information to determine an optimal modulating waveform for the current operating conditions. The optimal modulating waveform may have a corresponding frequency, frequency spread, shape, etc. Dithering circuitry 84 may use an algorithm to determine the optimal modulating waveform. The algorithm may be developed using machine learning techniques (e.g., neural networks, genetic algorithms, etc.) if desired. In some cases, the optimal waveform shape may be a randomized shape (e.g., with a randomized sequence of frequency steps as discussed in connection with FIGS. 6A and 6B). The optimized dithering pattern may conform to any constraints received by the dithering circuitry (e.g., occupied bandwidth constraint, dithering sequence memory constraint, maximum frequency jitter constraint, etc.).

As one example, dithering circuitry 84 may calculate an optimal modulated waveform depending on the current operating conditions. As another example, dithering circuitry 84 may have a plurality of modulating waveforms stored in memory. Each one of the modulating waveforms may have an associated set of operating conditions. Dithering circuitry 84 may select a modulating waveform from memory with associated operating conditions that best matches the real-time operating conditions and also that meets any real-time constraints.

Finally, at step 206, the optimized dithering pattern (e.g., the optimal modulating waveform) may be used to modulate the clock waveform (e.g., as shown in FIG. 3). The modified (dithered) clock signal is provided to inverter 61 to generate AC signals with coil 36.

As previously mentioned, frequency-shift keying (FSK) may be used to convey in-band data from device 12 to device 24. Power may be conveyed wirelessly from device 12 to device 24 during these FSK transmissions. Frequency dithering (as described above) may also be performed during FSK transmissions.

During FSK modulation, power transmitting device 12 may switch its operating frequency between a first operating frequency (e.g., unmodulated operating frequency $f_{op}$) and a second operating frequency (e.g., modulated operating frequency $f_{mod}$). The difference between the two frequencies has both a polarity (indicating whether the difference between $f_{mod}$ and $f_{op}$ is positive or negative) and a depth (indicating the magnitude of the difference between $f_{mod}$ and $f_{op}$).

Using the unmodulated operating frequency and the selected modulated operating frequency, the power transmitter may transmit bits using FSK modulation. The power transmitter may use a bit encoding scheme to transmit the bits using FSK modulation. In one illustrative example, the power transmitter may use a differential bi-phase encoding scheme to modulate data bits using the power signal. This type of bi-phase encoding scheme is shown in FIG. 11.

Figure 11:
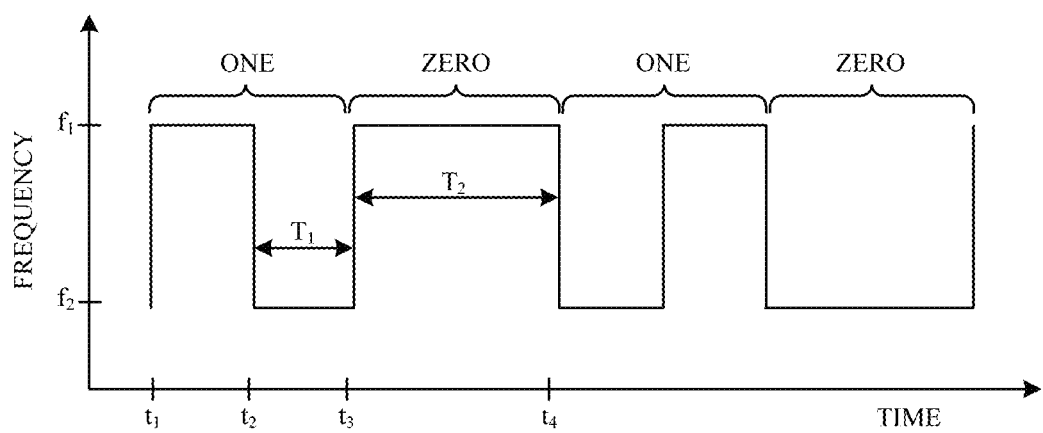
FIG. 11 is a diagram showing an illustrative frequency-shift keying (FSK) modulation bit encoding scheme in accordance with some embodiments.

FIG. 11 shows the power signal frequency over time during FSK modulation. The power signal frequency transitions between frequencies $f_1$ and $f_2$ to encode bits. Frequencies $f_1$ and $f_2$ may be equal to $f_{op}$ and $f_{mod}$ as discussed previously, with either $f_{op}$ or $f_{mod}$ being the higher of the two frequencies. As shown, in the encoding scheme of FIG. 11, a transition between the two frequencies occurs at the start of each bit. To encode a 'one' bit, there are two transitions in the power signal frequency. To encode a 'zero' bit, there is one transition in the power signal frequency.

For example, at $t_1$ the operating frequency (power signal frequency) transitions from $f_2$ to $f_1$. This indicates the start of encoding the one bit. The operating frequency may remain at $f_1$ for a given number of cycles of the power signal (e.g., 256 cycles) then transition back to $f_2$ at $t_2$. The operating frequency remains at $f_2$ for the given number of cycles. At $t_3$, the encoding of the one bit is complete.

At $t_3$, the operating frequency (power signal frequency) transitions from $f_2$ to $f_1$. This indicates the start of encoding the zero bit. The operating frequency may remain at $f_1$ for a given number of cycles (e.g., 512 cycles) then transition back to $f_2$ at $t_4$. At $t_4$, the encoding of the zero bit is complete.

To summarize, each bit (either a 'one' or 'zero') is transmitted over the same period of time (e.g., duration $T_2$ in FIG. 11). This period of time may sometimes be referred to as a bit period. For a zero bit, the operating frequency transitions once at the beginning of the bit period and then remains at the same operating frequency for the entire bit period ($T_2$). For a one bit, the operating frequency transitions once at the beginning of the bit period and again halfway through transmission of the bit. During encoding of a one bit, the operating frequency is therefore at both frequencies $f_1$ and $f_2$ for an equal duration of time $T_1$ that is half of $T_2$.

During encoding of bits using the differential bi-phase encoding scheme of FIG. 11, the frequency remains constant for either a duration of time $T_2$ or $T_1$ before transitioning to the other frequency. $T_1$ is half of $T_2$. These periods of time where the frequency is constant may be referred to as modulation states. The modulation states are used to convey bits using the bit encoding scheme.

To prevent the frequency dithering from impacting FSK communications, the dither pattern may repeat after a number of cycles of the power signal that is equal to a sub-multiple of (e.g., an exact divisor of) the number of power cycles in $T_1$ in FIG. 11 (e.g., the length of the shortest modulation state in the encoding scheme). For example, consider the example above where $T_1$ is equal to 256 cycles of the power signal. In this case, the total length of the repeating dither pattern (e.g., the period of the modulating waveform in FIG. 3, 5, 6A, or 6B) may be equal to any sub-multiple of 256 cycles (e.g., 1 cycle, 2 cycles, 4 cycles, 8 cycles, 16 cycles, 32 cycles, 64 cycles, 128 cycles, or 256 cycles). This ensures that the dither pattern is completed within a given modulation state and does not traverse multiple modulation states, which may simplify FSK demodulation for the receiver of the FSK communications (e.g., power receiving device 24).

This concept of selecting the total length of the repeating dither pattern to be equal to a sub-multiple of the total length of the shortest modulation state in the FSK encoding scheme may be used both for FSK communications from a wireless power transmitting device to a wireless power receiving device or for FSK communications from a wireless power receiving device to a wireless power transmitting device.

The foregoing is merely illustrative and various modifications can be made to the described embodiments. The foregoing embodiments may be implemented individually or in any combination.

What is claimed is:

1. A wireless power transmitting device configured to provide wireless power to a wireless power receiving device, comprising:
wireless power transmitting circuitry having an inverter and a wireless power transmitting coil, wherein the inverter is configured to receive a clock signal and supply corresponding alternating-current drive signals to the wireless power transmitting coil; and
control circuitry configured to frequency dither the clock signal provided to the inverter, wherein frequency dithering the clock signal comprises:
determining a modulating waveform based at least partly on an occupied bandwidth constraint; and
modulating the clock signal using the modulating waveform.

2. The wireless power transmitting device of claim 1, wherein the occupied bandwidth constraint limits a magnitude of frequency spread for the modulating waveform.

3. The wireless power transmitting device of claim 1, wherein the occupied bandwidth constraint is associated with a communication standard.

4. The wireless power transmitting device of claim 1, wherein the control circuitry is further configured to:
receive data indicating operating characteristics associated with the wireless receiving device.

5. The wireless power transmitting device of claim 4, wherein receiving the data indicating the operating characteristics comprises receiving the data indicating the operating characteristics using the wireless power transmitting coil.

6. The wireless power transmitting device of claim 5, wherein the received data comprises data indicating a communication standard.

7. The wireless power transmitting device of claim 1, wherein determining the modulating waveform comprises determining a frequency, a frequency spread, and a shape for the modulating waveform.

8. The wireless power transmitting device of claim 1, wherein the control circuitry is configured to determine the modulating waveform based at least partly on a maximum frequency jitter constraint.

9. The wireless power transmitting device of claim 1, wherein the control circuitry is configured to determine the modulating waveform based at least partly on a target power transmission frequency for the alternating-current drive signals.

10. The wireless power transmitting device of claim 1, wherein the modulating waveform comprises a shape selected from the group consisting of: a sawtooth shape, a sinusoidal shape, and a step shape that includes six different frequency steps.

11. The wireless power transmitting device of claim 1, wherein the control circuitry is configured to determine the modulating waveform based at least partly on a wireless power transmitting device parameter.

12. A wireless power transmitting device configured to provide wireless power to a wireless power receiving device, comprising:
wireless power transmitting circuitry having an inverter and a wireless power transmitting coil, wherein the inverter is configured to receive a clock signal and supply corresponding alternating-current drive signals to the wireless power transmitting coil; and
control circuitry configured to frequency dither the clock signal provided to the inverter, wherein frequency dithering the clock signal comprises:
determining a modulating waveform based at least partly on an electromagnetic interference (EMI) requirement at a frequency of interest; and
modulating the clock signal using the modulating waveform.

13. The wireless power transmitting device of claim 12, wherein the control circuitry is further configured to:
receive data indicating operating characteristics associated with the wireless receiving device.

14. The wireless power transmitting device of claim 13, wherein receiving the data indicating the operating characteristics comprises receiving the data indicating the operating characteristics using the wireless power transmitting coil.

15. The wireless power transmitting device of claim 13, wherein the received data comprises data indicating a communication standard.

16. The wireless power transmitting device of claim 12, wherein determining the modulating waveform comprises determining a frequency, a frequency spread, and a shape for the modulating waveform.

17. The wireless power transmitting device of claim 12, wherein the control circuitry is configured to determine the modulating waveform based at least partly on a target power transmission frequency for the alternating-current drive signals.

18. The wireless power transmitting device of claim 12, wherein the control circuitry is configured to determine the modulating waveform based at least partly on a wireless power transmitting device parameter.

19. A non-transitory computer-readable storage medium storing one or more programs configured to be executed by one or more processors of a wireless power transmitting device that is configured to provide wireless power to a wireless power receiving device, wherein the wireless power transmitting device comprises wireless power transmitting circuitry having an inverter and a wireless power transmitting coil and wherein the inverter is configured to receive a clock signal and supply corresponding alternating-current drive signals to the wireless power transmitting coil, the one or more programs including instructions for:
frequency dithering the clock signal provided to the inverter, wherein frequency dithering the clock signal comprises:
determining a modulating waveform based at least partly on an occupied bandwidth constraint; and
modulating the clock signal using the modulating waveform.

20. A non-transitory computer-readable storage medium storing one or more programs configured to be executed by one or more processors of a wireless power transmitting device that is configured to provide wireless power to a wireless power receiving device, wherein the wireless power transmitting device comprises wireless power transmitting circuitry having an inverter and a wireless power transmitting coil and wherein the inverter is configured to receive a clock signal and supply corresponding alternating-current drive signals to the wireless power transmitting coil, the one or more programs including instructions for:
frequency dithering the clock signal provided to the inverter, wherein frequency dithering the clock signal comprises:
determining a modulating waveform based at least partly on an electromagnetic interference (EMI) requirement at a frequency of interest; and
modulating the clock signal using the modulating waveform.

* * * * *